No. 668,577. Patented Feb. 19, 1901.
W. H. FISHER.
PHOTOGRAPHIC APPARATUS.
(Application filed June 29, 1891.)
(No Model.) 2 Sheets—Sheet 1.
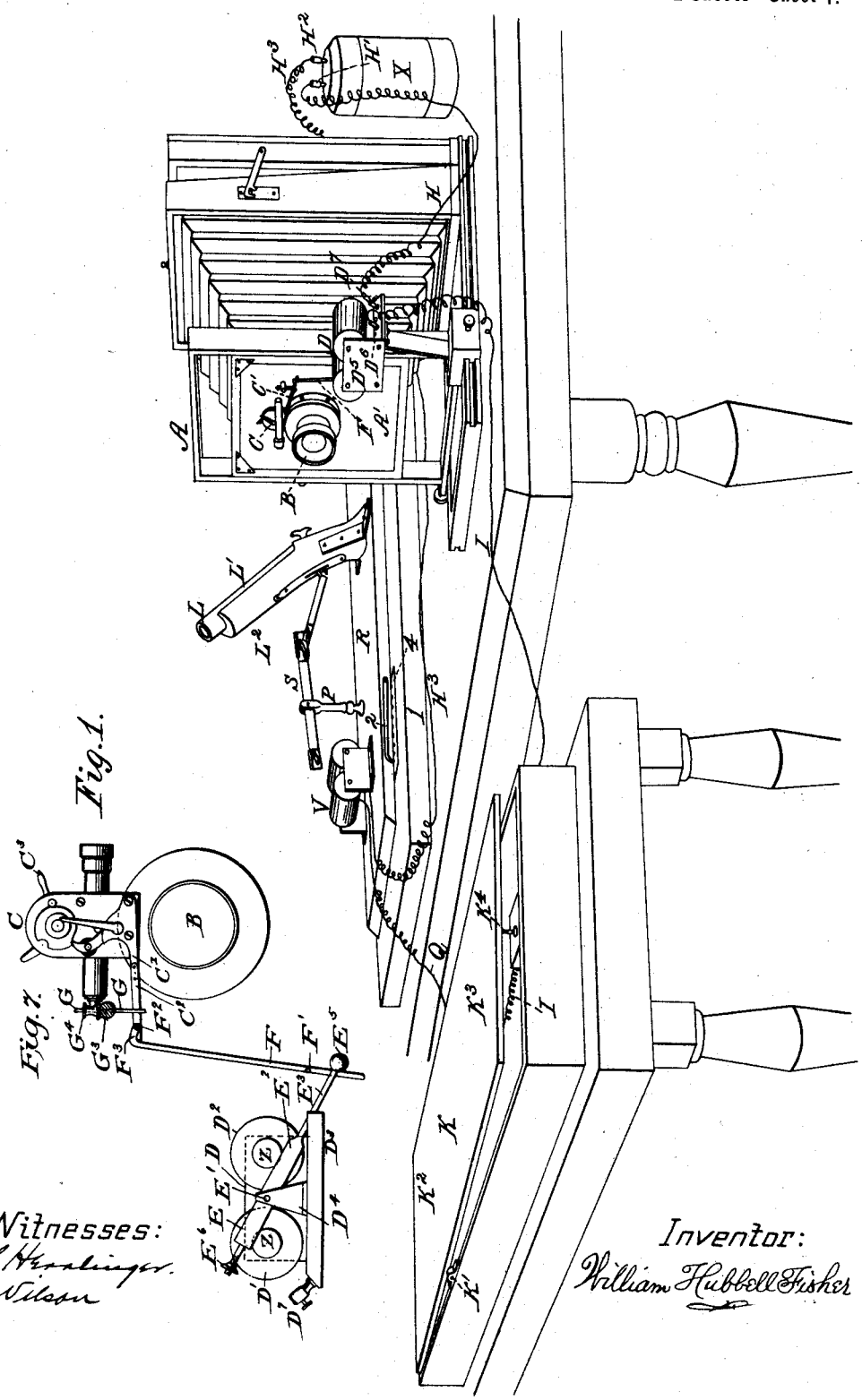
Witnesses:
Inventor:
William Hubbell Fisher

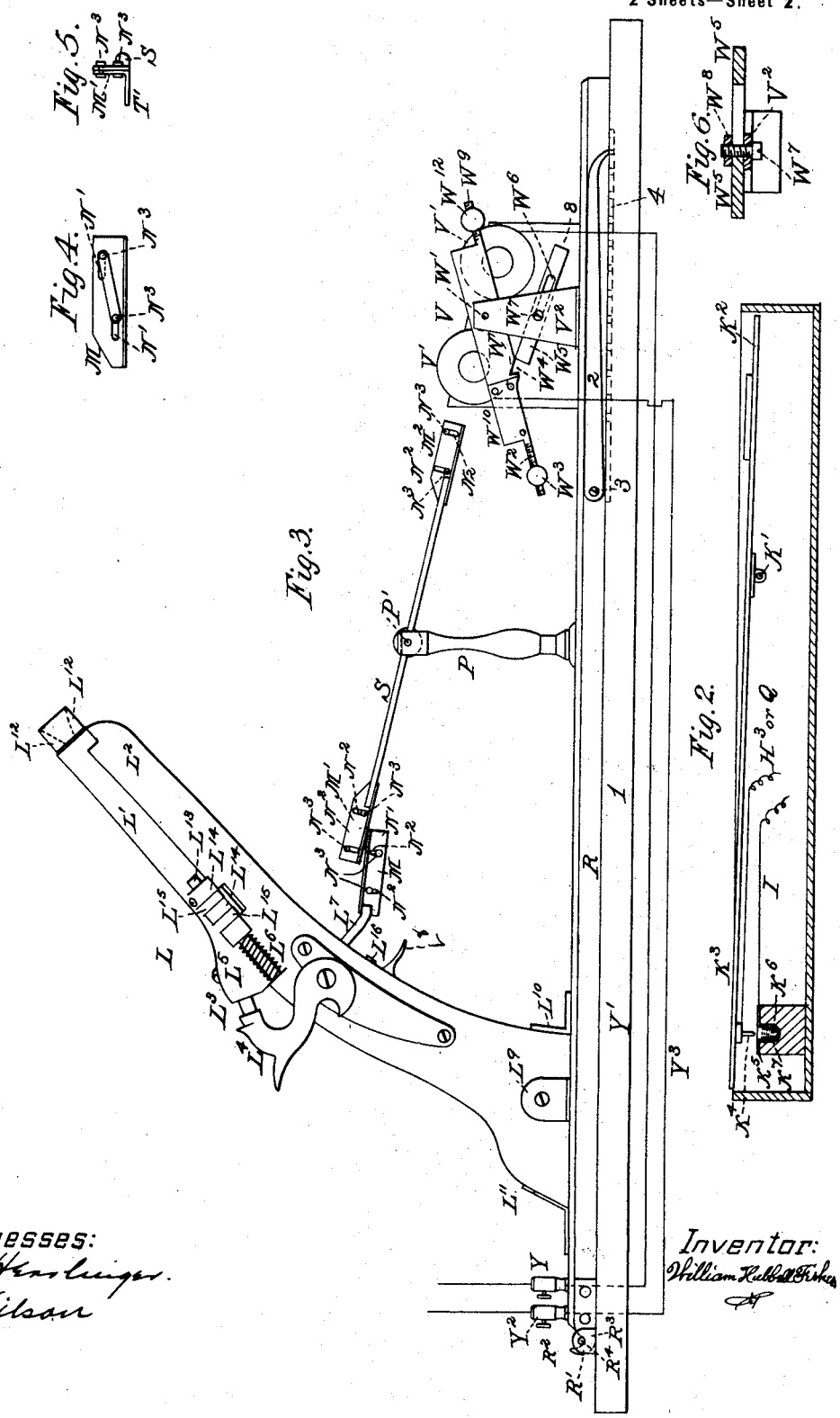

UNITED STATES PATENT OFFICE.

WILLIAM HUBBELL FISHER, OF CINCINNATI, OHIO.

PHOTOGRAPHIC APPARATUS.

SPECIFICATION forming part of Letters Patent No. 668,577, dated February 19, 1901.

Application filed June 29, 1891. Serial No. 397,863. (No model.)

*To all whom it may concern:*

Be it known that I, WILLIAM HUBBELL FISHER, a citizen of the United States, and a resident of Cincinnati, in the county of Hamilton and State of Ohio, have invented certain new and useful Improvements in Photographic Apparatus, of which the following is a specification.

The primary object of my invention is to provide mechanism by means of which photographs of men or animals or other moving objects may be taken by day or night and by which the objects to be photographed are made to furnish the material for said operation irrespective of their intentional concurrence; but much of the apparatus herein claimed is capable of and intended for other photographic uses.

The invention consists in the mechanism and arrangement and combination of parts hereinafter more specifically pointed out and claimed.

The several features of my invention and the various advantages resulting from their use conjointly or otherwise will be apparent from the following description and claims.

In the accompanying drawings, making a part of this specification and to which reference is hereby made, Figure 1 is a view in perspective of apparatus embodying my invention. Fig. 2 is a vertical central longitudinal section of the preferred kind of device for making and breaking the circuit. Fig. 3 is a side elevation of a novel description of apparatus for giving light at the desired moment for making a photographic impression upon the photographically-sensitized plate or film. Fig. 4 is an elevation of a side of the end portions of the levers shown in Fig. 2. The side shown in this figure is the one which is not shown in Fig. 2. Fig. 5 is a view of that end of the device shown in Fig. 4 which is at the right hand in said last-named figure. Fig. 6 is a transverse section of a device for holding the armature of the magnet of the flash-light apparatus at a given elevation for the purposes hereinafter mentioned. Fig. 7, Sheet 3, is a rear elevation showing certain features of the shutter-operating devices.

A indicates a camera of any suitable form and construction, and A' is the front board thereof.

B indicates the objective or lens, of any suitable kind. An aplanatic lens of short focus and achromatic is preferred. As far as possible consistent with rapidity of action the lens should be of the rectilinear class. The lens is suitably supported, preferably by the front board A' of the camera, in the usual manner. The lens is provided with a shutter C. This shutter should be of a kind which may be opened by suitable leverage or an equivalent impetus and shall when so set be capable of automatically closing itself. The description of shutter shown in the drawings is that known as the "Bausch & Lomb."

I prefer to operate the parts by electrical appliances.

D indicates the magnet, having the coils $D'$ $D^2$ in the present illustrative instance supported at rear by the vertical plate $D^5$, the latter fixed to and supported by the bed $D^3$ (see Fig. 1) and forming a horseshoe-magnet. In front of the free ends of the magnet is the armature E. This armature is pivoted on the pivot E', suitably supported. A convenient means for upholding it consists of the said plate $D^5$ at the rear of the magnet and the pillow block or bearing $D^4$ at the front of the said magnet and armature, substantially as shown. By means of this pivot the armature E is enabled to oscillate. The working end $E^2$ of the armature extends out and is there reduced in size, so as to diminish its weight and render less counterbalance-weight necessary at the other end of the armature. The end of this extension $E^3$ preferably terminates in the small weight $E^5$.

To enable the ends of the armature to be placed more or less in balance and also for enabling the operating end portion $E^3$ to be moved more quickly or slowly by a given electric force, the weight $E^6$, adjustable along the armature in the direction of the length of the latter, is provided. This adjustable weight $E^6$ is preferably located at that end portion of the armature E which is opposite where the end portion $E^3$ is located. A ready, simple, and convenient means for adjustment consists in providing the said weight with a female screw engaging a screw-thread on the end portion of the armature E.

One pole of the magnet is connected through contact $D^7$ and wire H to one pole H' of the battery or electrical generator. The other pole of the magnet is connected through contact $D^6$ and wires I and $H^3$ to the other pole $H^2$ of the battery, the circuit breaker and closer being located at some appropriate point in the circuit.

Where the mechanism already described is operated without the mechanism for discharging the flash-light, a convenient location for the circuit closer and breaker is between the wires I and $H^3$.

Where the aforedescribed mechanism is employed in enabling men or other animals to unconsciously take their own pictures, there may be employed a trap of the following description for closing and breaking the circuit:

K indicates a platform pivoted at $K'$. (See Figs. 1 and 2.) This platform is at its end $K^2$ so heavy or so weighted as when the platform is left to itself the end $K^2$ will fall and the end $K^3$ will rise. In Fig. 2 the end $K^2$ is seen loaded with a weight $K^4$. By means of such a weight moved nearer to or farther from the pivot $K'$ the end $K^3$ will be adapted to readily drop, according to the weight of the animal treading on the end $K^3$. Below this end $K^3$ and attached to the under side thereof is a metal contact stud or projection $K^4$, connected to one of the electrical conductors. Below the contact $K^4$ is a contact $K^5$, connected to the conductor I. The contact $K^5$ may consist of a flat piece of metal. In cases where men or other heavy animals step upon the trap this is sufficient for making a proper contact with the contact $K^4$ as the latter is brought against the said plate $K^5$ by the descent of the end $K^3$ of the platform K. In the case of very small animals, as birds or mice, the rebound of the upper contact $K^4$ after striking the lower contact $K^5$ is often such as to destroy the continuity of the circuit, and thus to destroy the prompt action of the magnetic coil D and the armature E. In the latter case the shutter will fail to be operated. To obviate such a disadvantageous result, I have provided a contact, as follows: $K^6$ is a cup or reservoir, located directly beneath contact $K^4$ and filled with liquid mercury to such a height that when the contact $K^4$ descends it will enter the mercury and close the circuit and yet not cause the mercury to overflow the cup. This contact is not disturbed by the vibrating movements imparted to the platform by the walking or running of small animals over its surface. The platform end $K^3$ begins to quickly move when the animal comes onto the said end and continues to quickly descend after the contact $K^4$ has touched the mercury and continues to descend until the base of the contact $K^4$ touches the upper edge of the reservoir or of the part surrounding the same. Another advantage of this mercurial contact is that it does not corrode. The preferred mode of making electrical connection between the conductor I and the mercury $K^7$ is by making the reservoir $K^6$ of metal and connecting the reservoir $K^6$ to the said conductor I. The mode in which this part of my invention operates is as follows: The camera is first focused on the part $K^3$ of the platform, or when the object of which a picture is to be taken is a tall one the camera is focused on the vertical plane of the center of the part $K^3$, but the center of the picture on the ground glass being opposite that part of the animal which is to occupy the center of the picture. The shutter is first closed and set so as to be ready to be opened when the platform is depressed, appropriate means being present to enable the platform as it is depressed to open the camera-lens shutter. Appropriate means are also present to cause the shutter to be promptly closed after the camera-shutter has been opened the requisite time for the sensitized plate in the camera to have been acted upon by the rays of light (picture) conveyed thereto through the lens-aperture. A photographic sensitized plate is placed within the camera, ready to be exposed. As the animal comes upon the end portion $K^3$ of the platform the said end portion descends and closes the circuit and opens the shutter of the camera-lens. By these movements the animal on the portion $K^3$ of the platform is impressed on the sensitized plate. In the case of animals other than man the animal will usually be attracted to the platform K $K^3$ by suitable bait.

When pictures are to be taken of animals by means of their own movements and without their intentional concurrence, it becomes desirable to employ a flash-light. In such event it is necessary that the flash-light should occur at the time when the animal is on the platform. In the case of many animals, man included, the amount of time during which the animal is on the platform is an exceeding small portion of time. It becomes very important, therefore, that the flash-light be instantaneously and certainly discharged. I have found that the ignition of flash-light powder by means of fine platinum wire in the circuit, this platinum wire being heated to a red-hot or white heat by the resistance it makes to the passage of the electrical current through it, is uncertain and not always sufficiently instantaneous. The wires do not heat as quickly at one time as another. The temperature of the atmosphere alters their speed of heating. When used in the open air, as it is frequently desirable to do—as, for example, when outdoor photographic exposures to secure certain outdoor pictures must be made—the moisture of the air, as well as its temperature, and the presence or absence of wind all affect the speed at which the platinum wire ignites the flash-light. I have therefore devised means whereby the flash-light shall be instantaneously and certainly discharged at a uniform rapidity and whereby the said rapidity can be certainly increased or diminished. These means are as follows:

L indicates a flash-light gun, of which L' is the barrel. This barrel and bore are preferably of a large diameter in order to contain and ignite a large amount of flash-light powder at a given discharge. The mouth of the bore is preferably beveled away toward the end of it, as indicated by the dotted lines $L^{12}$ of Fig. 3, so that the flash-light discharge shall be permitted to expand more quickly and spread the light over a larger area. The barrel is supported on a suitable stock or support, as $L^2$, and the latter is upheld from a bed or foundation R. In the present instance the support $L^2$ is fixed to the foundation R by means of side angle-irons $L^9$ and front angle-iron $L^{10}$ and rear angle-iron $L^{11}$, screwed to the foundation and to support $L^2$. The barrel L' is of the breech loading type and is adapted to receive at the rear a cartridge-shell having fulminating material located in its rear end and preferably at the center of said end. This fulminating material lies on an anvil of any desired form. A firing-pin $L^3$ is arranged to discharge the fulminating material by concussion in the usual manner, and $L^4$ is the hammer for striking the firing-pin and driving it forcibly against the fulminating material. Center fire is preferable to rim-fire in that the whole of the flash-light powder is more thoroughly ignited than by rim fire.

At the rear end of the barrel L' is a breech-piece $L^5$, hinged to the barrel by means of the pin $L^{13}$ passing through the hinge-pieces $L^{14}$ of the barrel and hinge-piece $L^{15}$ of the breech-piece $L^5$. The breech-piece may thus be moved over and sidewise and from behind the barrel, thus leaving open the rear end of the barrel, so that a cartridge of flash-light powder can be placed in the barrel. After a cartridge is thus located the breech-piece $L^5$ is closed down behind the barrel, locking the cartridge in place in the barrel. The firing-pin $L^3$ is in the breech-piece. After the cartridge has been discharged the breech-piece is again thrown back to permit the empty cartridge-shell to be removed and a fresh cartridge to be inserted.

It is undesirable that the barrel of the piece should break open downward, as the descent of the barrel would be likely to interfere with the mechanism now to be described.

$L^7$ is the regulator-trigger of the gun, whereby the hammer $L^4$ when drawn back and cocked is duly released. The great resistance made by such trigger and the difficulty of graduating that resistance at will, and hence of attaining certain valuable advantages, have led me to combine therewith a set-trigger $L^8$, together with a graduating-screw $L^{16}$. By these means the trigger $L^7$ may be set so as to go off at any degree of pull, from pounds down to a very small fraction of an ounce. It is to be noted that the connection between triggers $L^7$ and $L^8$ is preferably that which has long obtained in many rifles and (somewhat) guns. The trigger $L^7$ is the ordinary trigger, pulled to set in motion the hammer of the gun. When trigger $L^8$ is set in operation by pulling it back, it sets the trigger $L^7$, so as to pull off at a very slight pull upon it, (trigger $L^7$,) thus rendering trigger $L^7$ practically a hair-trigger. A set-screw $L^{16}$ is put into combination with the mechanism of the triggers, and the degree of nicety with which the trigger $L^8$ sets $L^7$ to pull off is accomplished by the proper advance or retraction of the set-screw. The trigger $L^7$ is provided with an adjustable end portion M, which latter consists of the two angulated plates T T'. One of these plates, T, is provided with vertical slots $N^2$ $N^2$ and the other plate, T', is provided with the longitudinal slots N', preferably connected by the inclined slot, substantially as shown. Through the forward longitudinal slot of the piece T and vertical slot of the piece T' of the lever S passes a set-screw $N^3$, and another set-screw $N^3$ is likewise located in the rear longitudinal slot of said plates. By these means the free end of the trigger is lengthened or shortened and the angle of the end plate which strikes the adjacent lever is fixed at will.

S is a lever having a pivotal fulcrum at P', the pivot P' being upheld on a suitable support, as P, fixed to the bed R or an equivalent foundation. Each end of this lever is provided with adjustable ends, respectively indicated by the characters M' $M^2$. Each of these adjustable ends is preferably constructed as is the end M of the trigger $L^7$.

V indicates a horseshoe-magnet having coils V' V' and having an armature W, pivotally upheld by pivot W', in turn supported by bearing $V^2$, the armature oscillating in front of the cores of the coils. The armature has an extended end $W^{10}$, located below the end $M^2$ of lever S. For the purpose of balancing this end $W^{10}$ an adjustable weight may be placed upon the rod-like end $W^9$, and a convenient means of adjustment thereon will be a screw-thread on the rod and a hollow screw through the weight. Where the end $W^{10}$ is light, the counterbalance $W^{12}$ will not be needed. Projecting from the end of extension-piece $W^{10}$ is a projecting arm $W^2$, carrying an adjustable weight $W^3$. The preferred mode of rendering this adjustable is by a female screw-thread in the weight engaging a screw-thread on the rod. By these means the amount of initial resistance and subsequent resistance of the armature to the moving force of the magnet when the circuit is closed is regulated, and hence the speed of the armature is regulated.

Instead of a weight $W^3$ I have found that by hanging more or less of little pieces of sheet metal upon the end $W^2$ the speed of the armature may thus be regulated. As the armature rises the extension $W^{10}$ thereof strikes the end $M^2$ of the lever S. The distance of the said extension $W^{10}$ from this end $M^2$ of the lever S is regulated by the adjustable support $W^5$, fixed to the bearing $V^2$ by a set-screw W⁷ passing through this bearing V², thence through a slot W⁶ in the support W⁵, and thence into a piece W⁸, wherein it engages a female screw. Thus that end of said support W⁵ which is beneath the forward or working half of the armature can be advanced or retracted, elevated or depressed, and then set in the desired position. The notch W⁴ may receive the said forward end of the support W⁵. Thus the distance of the extension W¹⁰ of the armature from the end M² of lever S may be regulated and the rapidity with which the armature shall strike the adjacent end of the said lever S is regulated. The purpose of the adjustable ends M M' M² is to regulate the speed of discharge of the gun. For example, the lengthening of the end M of the trigger and the shortening of the end M' of lever S lengthens the time elapsing between the closing of the circuit and the discharge of the gun, and the same principle obtains as to end M² in its interrelations to the end M' of said lever and the armature W. The parts T' T' will collide as the device N is depressed. According to the relative adjustment of the parts T' will the time of their collision be increased or diminished. This is particularly the case when the part T' of device M is advanced. It will be observed that the device M inclines from the trigger up toward the device M'. Hence advance of the part T' of device M moves that part rapidly toward the device M', and vice versa. The reverse is true of the advance of the part T' of device M', the part T' of device M being retracted. When desired, each part T' can be adjusted away from its companion piece T. Such adjustment or adjustments would also serve to change the adjustments. By reason of such capacities of adjustment of each of the devices M and M', I am enabled to adjust their time of collision to a great nicety and enable the flash-light gun to be discharged at a very exact point of time relatively to the depression of the platform and also relatively to the time when the largest light-aperture is allowed to the lens by the camera-shutter. Of course the darkness will under certain conditions take the place of a camera-shutter; but in places where a light is liable to be brought near the camera a shutter is necessary. When the apparatus is set for taking the photographs of wild nocturnal animals, a shutter is desirable—first, because of the rising moon; secondly, because in the absence of feeding animals the day-dawn will often come before the platform has been depressed, and, thirdly, because of accidental bringing of a light to the camera either by inadvertence or by some one ignorant and overcurious to inspect the mechanism. One pole of the magnet is connected to the contact Y by conductor Y' and the other pole of the magnet to the contact Y² by the conductor Y³.

When the flash-light is used in connection with the camera, it will, as ordinarily used, be necessary that the shutter of the camera open and close and that the flash-light be discharged at the time when the shutter is widest open. Where the night picture is to be taken by a person ready to cover the sensitized plate during the duration of darkness, no interadjustments of the relative movements of the camera-shutter and the flash-light through the mechanism operating them will be necessary; but as ordinarily employed the shutter of the camera should open when the burglar or other nocturnal animal bears down the platform K³ and makes the circuit and should immediately close. This necessity will be apparent when it is recollected that the burglar frequently carries a dark lantern whose rays, if the shutter were open prior to the circuit being made and prior to the flash-light, in many instances would damage the plate prior to the picture afterward impressed thereon by the flash-light, and no good picture could therefore be obtained.

In examining a camera and flash-light set at night in the woods for taking photographs of nocturnal animals it is frequently desirable to reëxamine the camera, &c., and this can only be done by the aid of a lantern, and this light would, if the shutter were open, damage the sensitized plate. So, also, the shutter should close after the flash-light is taken, otherwise the approach of a light by which to conveniently shut up the plate-holder and cover the plate after its exposure to the flash-light picture. Again, the coming of daylight while the shutter was open would destroy the image printed on the plate by the flash-light.

In employing the flash-light in connection with the camera I ordinarily, therefore, proceed as follows, viz.: The conductor H³ is detached from the contact K⁴ of the platform, Fig. 2, and is connected to one pole of the magnet V. The other pole of this magnet V is connected by the conductor Q to the contact K⁴ of the platform. The flash-light gun and the shutter of the camera are by means of the adjusting devices set so that the flash-light discharge shall take place after the shutter has opened and before it closes and when the shutter is widest open. The camera is now focused upon the point or place heretofore mentioned. The shutter is now closed and in position to open when liberated by the movement of the lever C' C², and a sensitized plate is placed in the camera and there uncovered. A flash-light cartridge is placed in the gun and the latter cocked and the set-trigger sprung. All this time the platform has been in the position shown in Figs. 1 and 2, the electrical circuit being broken. The person or animal coming onto part K³ of the platform depresses it and closes the circuit and instantly sets in motion both of the armatures E and W. These in turn respectively operate the camera-shutter, and the flash-light gun and a discharge of flash-light occurs as the shutter is wide open, and the lens by means of said light impresses on said plate a picture of the object whereby the platform $K^3$ was depressed. The shutter immediately closes, and at any desired time afterward the sensitized plate may be covered in the camera and withdrawn to be developed and fixed and used as a negative or positive or for transfer, as required.

The angle which the longitudinal axis of the barrel $L'$ makes with the horizontal may be varied as desired.

One very convenient mode of changing the angle of the flash-light gun, so as to throw the latter into a more vertical position, is shown in Figs. 1 and 3 and is as follows: 1 indicates the foundation or bed below the foundation R, which latter carries the flash-light gun and apparatus for operating the same. The bed or foundation R is pivoted at $R'$ to the bed 1. The preferred means for making this connection at $R'$ is as follows: At the rear end of the bed R and near each side thereof there is conected thereto a hook $R^2$. Attached to the foundation are studs $R^3$, one of which studs $R^3$ is adjacent to the hook $R^2$ and the other of which studs $R^3$ is adjacent to the other hook $R^2$. Each stud carries an arm $R^4$, which extends over the hook $R^2$. At the rear side of the foundation R, near the forward end, is pivoted a leg 2. This pivot is indicated by the character 3, and in the bed 1, immediately below the leg 2, is a rack 4. (Shown by dotted lines in Fig. 3 and by solid lines in Fig. 1.) As the forward end of the bed or foundation R is raised the front ends of each of the legs 2 2 will fall and fit into a tooth of the adjacent rack, and thus hold the bed in an inclined position, to which it has been lifted by hand. In this way the angle which the longitudinal axis of the gun-barrel makes with the bed R is altered at will, so that the light can be thrown either in a more vertical or in a more horizontal direction, as desired. By means of the hooks $R^2$ $R^2$ the bed R when raised to a vertical position can be unlocked from the arms $R^4$ and altogether removed from the bed 1.

While the various features of my invention are preferably employed together, one or more of them may be employed without the remainder, and in so far as applicable one or more of said features may be used in connection with photographic apparatus other than that herein specifically described.

What I claim as new and of my invention, and desire to secure by Letters Patent, is—

1. In combination with the flash-light gun, provided with the main trigger $L^7$, and set-trigger $L^8$, the magnet provided with the armature arranged to impinge against the main trigger $L^7$, substantially as and for the purposes specified.

2. In combination with the flash-light gun provided with the main trigger $L^7$, and set-trigger $L^8$, and adjusting-screw $L^{16}$, the magnet provided with the armature arranged to impinge against the main trigger $L^7$, substantially as and for the purposes specified.

3. The combination of the flash-light gun, trigger and oscillating lever S, and magnet provided with armature W, arranged when the circuit is closed to impinge against one end of the lever S and force the latter against the trigger of the gun, substantially as and for the purposes specified.

4. In combination with the flash-light gun having a trigger provided with adjusting-plates T, T', constructed substantially as described, and lever S provided at each end with similar adjusting-plates, and the magnet having the armature provided at its forward end with the adjusting-weight $W^3$, substantially as and for the purposes specified.

5. In combination with the flash-light gun having a trigger provided with adjusting-plates T, T', constructed substantially as described, the lever S provided at each end with similar adjusting-plates, the magnet having the armature provided at its forward end with the adjusting-weight $W^3$, and the supporting piece or bar $W^5$, adjustable, substantially as and for the purposes specified.

6. The combination of the flash-light gun and trigger and lever S, one end of which is adapted to impinge upon the trigger, the magnet, and armature whose forward end is adapted to impinge against the adjacent end of lever S, and supporting-piece $W^5$, provided with slot $W^6$, and set-screw $W^7$, and support $V^2$ and set-screw passing through said support and through said slot $W^6$ and secured in the support $W^5$, substantially as and for the purposes specified.

7. The combination of the flash-light gun and trigger, the lever S, and magnet and armature W, provided at one end with the adjustable weight $W^3$, and at the other end with the adjustable weight $W^{12}$, substantially as and for the purposes specified.

8. The combination of the flash-light gun, and lever S, and armature W, and adjustable plates T, T', one plate provided with the vertical slots $N^2$, $N^3$, and the other plate provided with the horizontal slots $M'$, $M^2$, substantially as and for the purposes specified.

9. The combination of the flash-light gun, the magnet and armature for operating the same, bed R and foundation-piece 1, the bed R being pivoted at $R'$, $R^2$ to the bed 1, and having the legs 2, the bed 1 being provided with the racks 4, for engaging the points of the legs 2 of bed R as the latter is raised, substantially as and for the purposes specified.

10. The combination of the flash-light gun, armature for operating the same, the bed R having legs 2, 2, and hooks $R^2$, $R^2$, and bed 1 having studs $R^3$, $R^3$, each provided with the arm $R^4$, and also with the rack 4 for engaging the point of the leg 2, as the latter is elevated, substantially as and for the purposes specified.

11. The flash-light gun provided with the gun-barrel L', and having its mouth provided with the beveled or trumpet opening L$^{12}$, substantially as and for the purposes specified.

12. The combination of the camera, lens and shutter, and magnet provided with armature adapted to operate the shutter, and device substantially as described for elevating the lever C$^2$, and flash-light gun provided with the trigger and the armature W, adapted, by means substantially as described, to impart motion to the trigger of the said gun, and the circuit closing and breaking device connected to conductors whereby the electrical circuit passes from the battery or source of electrical energy through the magnet D, and magnet B when the circuit is closed, substantially as and for the purposes specified.

13. In a photographic apparatus, the combination of a camera having a shutter, a flash-light device, and means for actuating the shutter and the flash-light device, and comprising mechanism capable of adjustment to vary the interval between the operation of the flash-light device and shutter, substantially as set forth.

WILLIAM HUBBELL FISHER.

Attest:
A. L. HERRLINGER,
HENRY APPLETON.